(12) United States Patent
Merrill et al.

(10) Patent No.: US 8,395,070 B2
(45) Date of Patent: Mar. 12, 2013

(54) ELECTRICAL CONTACT POINT DEVICE FOR USE IN A PLASMA ARC CUTTING TORCH

(75) Inventors: Matt Merrill, Bradenton, FL (US); Jeffrey Walters, Sr., Sarasota, FL (US)

(73) Assignee: American Torch Tip, Bradenton, FL (US)

( * ) Notice: Subject to any disclaimer, the term of this patent is extended or adjusted under 35 U.S.C. 154(b) by 360 days.

(21) Appl. No.: 12/752,413

(22) Filed: Apr. 1, 2010

(65) Prior Publication Data

US 2011/0240608 A1  Oct. 6, 2011

(51) Int. Cl.
*B23K 9/00*  (2006.01)
(52) U.S. Cl. ......... 219/74; 219/75; 219/86.16; 219/119; 373/82; 373/88; 373/91; 403/296; 403/299; 313/231.31; 313/231.41
(58) Field of Classification Search ............. 219/74–75, 219/86.16, 119, 121.36–121.56; 403/296, 403/299–314; 373/82, 88, 91; 313/231.31, 313/231.41
See application file for complete search history.

(56) References Cited

U.S. PATENT DOCUMENTS

| | | | |
|---|---|---|---|
| 4,628,177 A | 12/1986 | Dempsey et al. | |
| 5,451,739 A | 9/1995 | Nemchinsky et al. | |
| 5,676,864 A | 10/1997 | Walters | |
| 5,767,478 A | 6/1998 | Walters | |
| 5,856,647 A | 1/1999 | Luo | |
| 6,191,381 B1 | 2/2001 | Kabir | |
| 6,207,923 B1 | 3/2001 | Lindsay | |
| 6,368,451 B1 * | 4/2002 | Goulette et al. | 174/152 R |
| 6,403,915 B1 | 6/2002 | Cook et al. | |
| 6,903,301 B2 | 6/2005 | Jones et al. | |
| 7,081,597 B2 | 7/2006 | Severance, Jr. | |
| 2006/0196854 A1 | 9/2006 | Severance, Jr. | |
| 2007/0125755 A1 | 6/2007 | Mather et al. | |
| 2007/0210034 A1 * | 9/2007 | Mather et al. | 219/121.5 |
| 2007/0210035 A1 | 9/2007 | Twarog et al. | |
| 2008/0173622 A1 | 7/2008 | Lindsay et al. | |

FOREIGN PATENT DOCUMENTS

EP  1 765 045  3/2007

OTHER PUBLICATIONS

International Search Report and Written Opinion dated May 23, 2011, World Intellectual Property Organization, PCT/US2011/029358.

* cited by examiner

*Primary Examiner* — Steven Loke
*Assistant Examiner* — Cuong Nguyen
(74) *Attorney, Agent, or Firm* — Roger D. Emerson; Emerson Thomson Bennett

(57) ABSTRACT

Some embodiments relate to an electrical contact assembly for a plasma torch tip, and may include an electrical contact portion, a compressible portion in mechanical communication with the contact, and a mounting portion in mechanical communication with the compressible portion. Some embodiments may be adapted to maintain contact with an uneven substrate during translation of the torch tip.

10 Claims, 1 Drawing Sheet

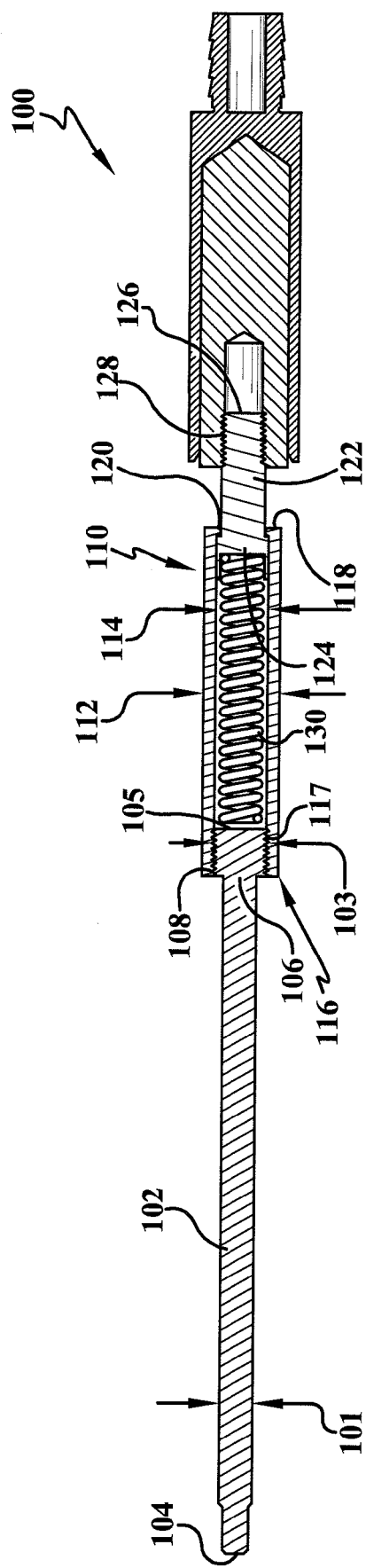
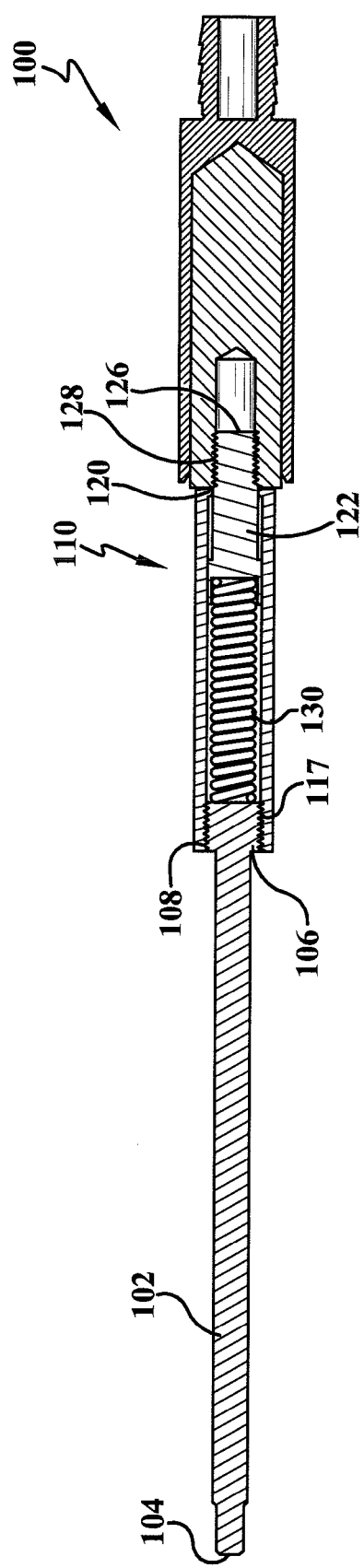
FIG. 1A
FIG. 1B

ELECTRICAL CONTACT POINT DEVICE FOR USE IN A PLASMA ARC CUTTING TORCH

I. BACKGROUND OF THE INVENTION

A. Field of Invention

The present invention relates generally to a plasma arc torch and, more particularly, to an electrical contact point for a plasma arc torch.

B. Description of the Related Art

Plasma torch tips are known in the welding arts. Existing tips generally comprise a negative electrode housed within cutting gas delivery tube, which in turn is usually coaxially housed within a shielding gas delivery tube. The torch operates by providing a flow of shielding and cutting gases, applying a potential to the negative electrode and contacting the tip to a positively charged metallic substrate. Such contact completes a circuit and forms a plasma jet directed toward the positively charged substrate, which cuts the substrate. One problem with existing systems is that they may lose contact with the receptacle from vibration during cutting. This is especially problematic where the gantry is moving.

The present invention provides an alternative to existing torch contact points that differs from existing torch contact points and overcomes one or more of the shortcomings thereof.

II. SUMMARY OF THE INVENTION

Some embodiments of the present invention relate to an electrical contact assembly for a plasma torch tip, comprising: an electrically conductive contact portion having a first end and a second end; a compressible portion in mechanical communication with the second end of the electrical contact portion; and a mounting portion adapted to mount the assembly to a plasma torch.

Other embodiments relate to a plasma torch tip electrical contact assembly, comprising: a contact defining a cylinder having an annular cross section and a linear longitudinal axis and having a minor diameter, the contact having a first end and a second end, the second end having a major diameter greater than the minor diameter and the major diameter further defining a male threaded portion; a spring housing defining a cylinder having an outer diameter and an annular cross section and the housing defining a linear longitudinal axis, and the housing further defining an inner diameter greater than zero, the inner diameter and outer diameter together defining a hollow cylindrical housing including a main housing body, the housing further including a first end and a second end at either end of the main housing body, the first end defining a female threaded portion adapted to mate with the male threaded portion of the contact, and the second end having an inner diameter less than that of the main housing body thereby defining an retaining ridge extending inward toward the longitudinal axis; a plunger defining a cylinder having an outer diameter and an annular cross section and the plunger defining a linear longitudinal axis, the plunger comprising a first end and a second end, the first end defining plunger head having a plunger major diameter extending a portion of the length of the plunger and being less than the inner diameter of the main housing body but greater than the diameter of the retaining ridge, and the second end defining a male threaded portion, and the balance of the plunger defining a minor diameter less than that of the plunger major diameter; and a coil spring disposed within the main housing body, the spring having a first end abutting the contact and a second end abutting the plunger head, and the spring biasing the plunger head against the retaining ridge.

Other benefits and advantages will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIG. 1A is a cross sectional view of an embodiment in a fully extended configuration; and FIG. 1B is a cross sectional view of the same embodiment in a fully compressed configuration.

IV. DETAILED DESCRIPTION OF THE INVENTION

The present invention generally relates to plasma torch tips having electrical contacts that are adjustable in length. According to some embodiments a tip can include a contact in mechanical communication with a longitudinally compressible portion. Some embodiments also include a mounting means at an opposing end of the compressible portion, which is adapted to mate with a plasma torch assembly.

A suitable contact can comprise a generally cylindrical shape. Here as elsewhere in the specification and claims, the term cylinder includes any three dimensional shape that can be defined by a integrating any two dimensional shape over a linear axis. Suitable two dimensional shapes include without limitation circles, triangles, rectangles and higher polygons. Furthermore, a cylinder need not be a right cylinder. According to some embodiments the contact can include a minor diameter defining most of the contact, and larger major diameter defining an end of the contact. In some embodiments the major diameter may include a threaded portion such as a male threaded portion. A suitable contact can comprise brass, copper, copper alloys, nickel alloys, tungsten, molybdenum, tantalum, niobium, thorium, thallium, silver, gold, or any combination thereof.

A compressible portion can include a spring assembly. For example, in some embodiments a compressible portion includes a spring housing enclosing a coil spring. The spring housing can mate with the contact at one end of the housing, and the coil spring can be disposed within the housing with one end abutting an end of the contact. The assembly can further include a plunger abutting the opposing end of the spring, and adapted to compress the spring. In some embodiments the plunger may be retained by the housing. In other embodiments the coil spring can be replaced with a gas piston assembly. In other embodiments, the compressible portion can comprise one or more of a hydraulic piston, a solenoid, or a servo.

A mounting means can include any of a wide variety of structures for mechanically coupling the assembly to a plasma torch. For instance, in some embodiments the plunger can include a male or female threaded portion at an end opposing the plunger head. Other structures can include latching, locking, ferrule, compression, or quick connect structures as will be apparent to one of skill in the art.

Referring now to the drawings wherein the showings are for purposes of illustrating embodiments of the invention only and not for purposes of limiting the same, FIG. 1A is a longitudinal cross sectional view of an embodiment 100 shown in a fully extended configuration. FIG. 1B shows the embodiment of FIG. 1A in a fully compressed configuration. The embodiment 100 comprises a contact 102. The contact includes a first end 104 and a second end 105, and defines a minor diameter 101 extending over a substantial portion of the contact's length. The second end 105 defines a major diameter 103 upon which is formed a male threaded portion 108. The male threaded portion 108 mates with a female threaded portion 117 of a spring housing 110.

With further reference to FIG. 1A the housing 110 defines a first end 116, a second end 118, an outer diameter 112, and an inner diameter 114. The overall shape of the housing 110 is generally that of a hollow right circular cylinder having a substantially uniform thickness and defining an inner cavity for receiving a coil spring 130. The first end includes the female threaded portion 117. The second end includes a retaining ridge 120 extending inwardly from an inner wall defined by the inner diameter 114. The coil spring 130 is oriented generally coaxially with the spring housing 110 and abuts the second end 106 of the contact 102.

With still further reference to FIG. 1A, the inner cavity of the housing 110 receives a head 124 of a plunger 122, and the retaining ridge 120 at the second end 118 of the housing 110 retains the plunger head 124 inside the cavity and abuts an end of the spring 130. An opposing end 126 of the plunger 122 includes a male threaded portion 128 for mounting the embodiment 100 onto a plasma torch assembly.

The embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof.

We claim:

1. An electrical contact assembly for a plasma torch tip, comprising:
    an electrically conductive contact portion having a first end and a second end;
    a compressible portion in mechanical communication with the second end of the electrically conductive contact portion;
    a mounting portion adapted to mount to a plasma torch;
    wherein the compressible portion comprises a spring assembly;
    wherein the assembly includes a spring housing adapted to receive a coil spring in a generally coaxial relation;
    wherein the spring housing defines an outer diameter and an inner diameter together defining a generally uniform cylindrical wall comprising a spring housing main body and enclosing a hollow cavity adapted to receive the coil spring;
    wherein the spring housing has a first end and a second end including a retaining ridge, the retaining ridge extending inward toward a longitudinal axis from the inner diameter of the spring housing, and the retaining ridge has an inner diameter and an outer diameter; and,
    wherein the compressible portion further comprises a plunger received by the hollow cavity, and the plunger defining a head and a shaft, the head having an outer diameter less than the inner diameter of the spring housing and greater than the inner diameter of the retaining ridge, and the shaft having an outer diameter less than the inner diameter of the retaining ridge.

2. The electrical contact assembly of claim 1, wherein the plunger includes an end opposing the head, the end including a means for mounting to the plasma torch.

3. The electrical contact assembly of claim 2, wherein the means for mounting comprises a male thread.

4. A plasma torch tip electrical contact assembly, comprising:
    a contact defining a cylinder having an annular cross section and a linear longitudinal axis and having a minor diameter, the contact having a first end and a second end, the second end having a major diameter greater than the minor diameter and the major diameter further defining a male threaded portion;
    a spring housing defining a cylinder having an outer diameter and an annular cross section and the spring housing defining a linear longitudinal axis, and the housing further defining an inner diameter and an outer diameter greater than zero, the inner diameter and outer diameter together defining a hollow cylindrical housing including a main housing body, the spring housing further including a first end and a second end at either end of the main housing body, the first end defining a female threaded portion adapted to mate with the male threaded portion of the contact, and the second end having an inner diameter less than that of the main housing body thereby defining a retaining ridge extending inward toward the longitudinal axis;
    a plunger defining a cylinder having an outer diameter and an annular cross section and the plunger defining a linear longitudinal axis, the plunger comprising a first end and a second end, the first end defining a plunger head having a major diameter extending a portion of the length of the plunger and being less than the inner diameter of the main housing body but greater than an inner diameter of the retaining ridge, and the second end defining a male threaded portion, and the balance of the plunger defining a minor diameter less than that of the plunger major diameter; and
    a coil spring disposed within the main housing body, the coil spring having a first end abutting the contact and a second end abutting the plunger head, and the coil spring biasing the plunger head against the retaining ridge.

5. An electrical contact assembly for use with an associated plasma torch assembly, comprising:
    an electrically conductive contact having a first end defining an electrode contact tip and a second end;
    a spring housing having a first end that is fixedly attached to the second end of the electrically conductive contact and a second end;
    a plunger having a first end that is attached to the second end of the spring housing in a manner that permits the spring housing to move relative to the plunger and a second end that is fixedly mountable to the associated plasma torch assembly; and,
    a spring positioned within the spring housing that biases the electrically conductive contact and the spring housing to move together away from the associated plasma torch assembly.

6. The electrical contact assembly of claim 5 wherein the spring housing has an inner chamber that: (1) encloses the spring; and, (2) receives the first end of the plunger.

7. The electrical contact assembly of claim 5 wherein the spring has: (1) a first end that contacts the second end of the electrically conductive contact; and, (2) a second end that contacts the first end of the plunger.

8. The electrical contact assembly of claim 5 wherein:
    the second end of the spring housing comprises a retaining ridge that extends inwardly from an inner wall of the spring housing;

the first end of the plunger has a head that is received within an inner chamber of the spring housing; and, the retaining ridge prevents the plunger head from being removed from the second end of the spring housing.

9. The electrical contact assembly of claim 5 wherein:

the electrically conductive contact has a substantially cylindrical shape;

the first end of the electrically conductive contact has a first diameter;

the second end of the electrically conductive contact has a second diameter;

a mid-section of the electrically conductive contact has a third diameter;

the third diameter is greater than the first diameter; and, the second diameter is greater than the third diameter.

10. The electrical contact assembly of claim 5 wherein:

the second end of the electrically conductive contact is threadingly attached to the first end of the spring housing;

the second end of the plunger has a threaded portion that can be threadingly attached to the associated plasma torch assembly; and, the spring housing has an inner chamber that receives the first end of the plunger.

* * * * *